United States Patent
Wong et al.

(10) Patent No.: US 9,838,534 B2
(45) Date of Patent: Dec. 5, 2017

(54) MULTIPLE PERSONA SUPPORT FOR COMMUNICATIONS

(71) Applicants: AT&T Intellectual Property I, L.P., Atlanta, GA (US); AT&T Mobility II LLC, Atlanta, GA (US)

(72) Inventors: Tony Wong, Dallas, TX (US); Satish Janardan, Plano, TX (US); Robert Hammond, Grapevine, TX (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 224 days.

(21) Appl. No.: 14/507,813

(22) Filed: Oct. 6, 2014

(65) Prior Publication Data
US 2016/0100053 A1 Apr. 7, 2016

(51) Int. Cl.
*H04M 3/42* (2006.01)
*H04M 3/436* (2006.01)

(52) U.S. Cl.
CPC ....... *H04M 3/42068* (2013.01); *H04M 3/436* (2013.01)

(58) Field of Classification Search
CPC .............. H04M 3/436; H04M 3/42059; H04M 3/42068; H04M 3/54; H04M 3/543; H04W 4/16
USPC .......................... 379/201.01–201.02; 455/417
See application file for complete search history.

(56) References Cited

U.S. PATENT DOCUMENTS

| 6,289,084 | B1 | 9/2001 | Bushnell |
| 7,433,455 | B1 * | 10/2008 | Oran ...................... H04M 3/38 379/201.01 |
| 7,703,023 | B2 | 4/2010 | O'Mahony et al. |
| 7,853,696 | B2 | 12/2010 | Caballero-McCann et al. |
| 8,032,143 | B2 | 10/2011 | Silver et al. |
| 8,306,191 | B2 | 11/2012 | Balasaygun et al. |
| 8,553,679 | B2 | 10/2013 | Gorti et al. |
| 8,589,529 | B2 | 11/2013 | Siegel et al. |
| 8,634,425 | B2 | 1/2014 | Gorti et al. |
| 2006/0045252 | A1 | 3/2006 | Gorti et al. |

(Continued)

OTHER PUBLICATIONS

Schulzrinne et al., "Session Initiation Protocol (SIP)-H.323 Interworking Requirements," Jul. 2005, The Internet Society.

(Continued)

*Primary Examiner* — Rasha Al Aubaidi
(74) *Attorney, Agent, or Firm* — Hartman & Citrin LLC

(57) ABSTRACT

Concepts and technologies are disclosed herein for providing multiple persona support for communications. A processor, at the device, can execute a persona service. The persona service can create one or multiple containers/highly secure work space(s) within the user device. The processor, at the administrator level of the specific work group, can detect a communication request comprising a request to initiate a communication. The processor can determine if the communication comprises a call. If a determination is made that the communication comprises the call, the processor, based on the profiles of the parties, can obtain call handling rules/policies, initiate setup of a communication path for the call, provide contacts to parties to the call, and determine how the call is handled. If a determination is made that the call is accepted, the processor can allow initiation of the call, or other appropriate treatments

19 Claims, 9 Drawing Sheets

(56) References Cited

U.S. PATENT DOCUMENTS

| | | |
|---|---|---|
| 2009/0059818 A1 | 3/2009 | Pickett |
| 2009/0129561 A1 | 5/2009 | Siegel et al. |
| 2010/0082695 A1 | 4/2010 | Hardt |
| 2010/0165070 A1* | 7/2010 | Goffin .................. H04M 1/578 348/14.01 |
| 2014/0171051 A1 | 6/2014 | Rice |
| 2014/0220932 A1 | 8/2014 | Ring et al. |

OTHER PUBLICATIONS

Rosenberg et al., "Caller Preferences for the Session Initiation Protocol (SIP)," Aug. 2004, The Internet Society.

* cited by examiner

MULTIPLE PERSONA SUPPORT FOR COMMUNICATIONS

BACKGROUND

When a communication is initiated between a sending device and a receiving device (e.g., a calling party and a called party), caller identification ("callerID") information is sometimes displayed to assist users of the respective devices in identifying parties to the communication. Generally speaking, the calling party accesses a local directory such as a contact list, locates information that relates to a party being called or otherwise communicated with, and displays the information on a visual display. The called party, meanwhile, generally executes a similar process to match a phone number or other contact information exposed during a communication with a calling party, and displays information for a user to identify a calling party, a sending party, or the like.

Generally speaking, the information displayed at the calling and/or called devices (or sending and/or receiving devices) can be based on information stored in a local data storage location. Some technologies support using remote contact lists, or the like, but these technologies can be confusing for users and/or can cause latency and/or other performance issues during queries. For example, if a user is outside of work, the lookups or queries performed to access data relating to a calling party may cause latency and/or performance issues, while if the user is not working this lookup or query may not be needed or desired.

SUMMARY

The present disclosure is directed to providing multiple persona support for communications. A persona service can be executed by a computing device such as a server computer to provide multiple persona support for communications. In some embodiments, the user device can initiate a communication with another device such as a receiving device, a called device, or the like. The communication can occur, in some embodiments, over a communication path. The communication can include an email, an instant message, a telephone call, a voice-over-IP ("VoIP") call, a notification (e.g., a push notification, a special purpose short message, a control channel signal, or the like), a text message, a multimedia message service ("MMS") message, combinations thereof, or the like. As such, the communication path can be established over a control channel, a data pipeline, a voice channel, combinations thereof, or the like. At initiation of a communication at the user device, a persona application executed by the user device can generate a signal, request, or service call to the persona service or elsewhere, in some embodiments, though this is not necessarily the case. Additionally, or alternatively, the persona service can query profiles and/or policies to determine one or more handling rules associated with the communication. The handling rules can define call routing for the communications, or the like.

If the communication corresponds to a communication such as an email, text message, instant message, or the like, the persona service can identify one or more contacts associated with the parties to the communication and provide the contacts to the parties engaged in the communication. The persona service also can be configured to allow delivery of the communication. If the communication corresponds to a call, the persona service can identify one or more call handling rules, which can be based upon the profiles and/or the policies. The call handling rules can define whether or not calls are to be allowed, blocked, sent to voicemail, or the like. The call handling rules also can define interruption rules that may specify when and how activities occurring at a device within one space may be interrupted to accommodate calls in a different space.

If the call handling rules define that the call is to be completed, the persona service can obtain contacts for the calling and called parties, and provide those contacts to the parties for display and/or use during the call. If the call is not to be allowed, the call can be routed to another destination such as a voicemail system, an assistant, an announcement, or the like. Thus, the persona service can use profiles and/or policies to determine if calls are to be completed, to provide contacts for the calls, and/or to define how the calls will be routed. In some embodiments, the contacts obtained by the persona service can be used to override or replace contact information included in a contact list or directory associated with one or more devices involved in a communication (e.g., a sending or calling device and a receiving or called device). In some instances, the contact override functionality can be used if a device is operating in accordance with some personas, but not others (e.g., in a work persona but not a personal persona). In various embodiments of the concepts and technologies described herein, the persona service can support archiving functionality. Thus, the persona service can be configured to support archiving during any communication for various reasons.

According to one aspect of the concepts and technologies disclosed herein, a method is disclosed. The method can include detecting, at a processor executing a persona service at the user device, a communication request that can include a request to initiate a communication. The method also can include determining, at the processor, at the information technology administrator level of the work space, if the communication includes a call, and if a determination is made that the communication includes the call, obtaining, by the processor, call handling rules, initiating, by the processor, setup of a communication path for the call, providing, by the processor, contacts to parties to the call, determining, by the processor, if the call is accepted, and if a determination is made that the call is accepted, allowing, by the processor, initiation of the call.

In some embodiments, the method also can include if a determination is made that the communication does not include the call, providing, by the processor, the contacts to parties to the communication, and allowing, by the processor, delivery of the communication. In some embodiments, providing the contacts includes providing a first contact to a user device associated with a calling party and a providing a second contact to a called device associated with a called party. The second contact can include an image associated with the calling party, a phone number associated with the calling party, and an organization associated with the calling party.

In some embodiments, obtaining the call handling rules can include obtaining a profile and a policy associated with the called party, and determining a call routing based upon analysis of the profile and the policy. In some embodiments, determining the call routing can include determining an active space associated with the called party, determining if the called device is busy, and if a determination is made that the called device is busy, determining if a policy suggests interruption of a communication in which the called device is engaged. The policy can be based upon the active space. In some embodiments, the method also can include if a determination is made that the policy suggests interruption of the communication, routing the communication to another destination, and allowing initiation of the call.

In some embodiments, the active space can include one space selected from a group of spaces including a personal space and a work space, and the active space can include a virtual environment hosted by a persona application executed by the called device. In some embodiments, determining the call routing can include determining an active space associated with the called party, determining if the called device is located in an irregular time zone or geo-location that differs from a time zone and geo-location associated with the active space, and if a determination is made that the called device is located in the irregular time zone or geo-location, routing the call to another destination. In some embodiments, the other destination can include a voicemail box associated with the called device. In some embodiments, the method also can include determining that the communication should be archived, and archiving the communication.

According to another aspect of the concepts and technologies disclosed herein, a system is disclosed. The system can include a processor and a memory. The memory can store computer-executable instructions that, when executed by the processor, cause the processor to perform operations. The operations can include detecting a communication request including a request to initiate a communication, determining, at the processor, if the communication can include a call, and if a determination is made that the communication can include the call, obtaining call handling rules, initiating setup of a communication path for the call, providing contacts to parties to the call, determining if the call is accepted, and if a determination is made that the call is accepted, allowing initiation of the call.

In some embodiments, providing the contacts can include providing a first contact to a user device associated with a calling party and a providing a second contact to a called device associated with a called party. The second contact can include an image associated with the calling party, a phone number associated with the calling party, and an organization associated with the calling party. In some embodiments, obtaining the call handling rules can include obtaining a profile and a policy associated with the called party and determining a call routing based upon analysis of the profile and the policy. Determining the call routing can include determining an active space associated with the called party, determining if the called device is busy, and if a determination is made that the called device is busy, determining if a policy suggests interruption of a communication in which the called device is engaged. The policy can be based upon the active space.

In some embodiments, obtaining the call handling rules can include obtaining a profile and a policy associated with the called party, and determining a call routing based upon analysis of the profile and the policy. Determining the call routing can include determining an active space associated with the called party, determining if the called device is located in an irregular time zone or geo-location that differs from a time zone and geo-location associated with the active space, and if a determination is made that the called device is located in the irregular time zone or geo-location, routing the call to another destination. In some embodiments, execution of the computer-executable instructions can cause the processor to perform operations further including if a determination is made that the policy suggests interruption of the communication, routing the communication to another destination, and allowing initiation of the call.

According to yet another aspect, a computer storage medium is disclosed. The computer storage medium can have computer-executable instructions stored thereon that, when executed by a processor, cause the processor to perform operations. The operations can include detecting a communication request including a request to initiate a communication, determining, at the processor, if the communication can include a call, and if a determination is made that the communication can include the call, obtaining call handling rules, initiating setup of a communication path for the call, providing contacts to parties to the call, determining if the call is accepted, and if a determination is made that the call is accepted, allowing initiation of the call.

In some embodiments, providing the contacts can include providing a first contact to a user device associated with a calling party and a providing a second contact to a called device associated with a called party. The second contact can include an image associated with the calling party, a phone number associated with the calling party, and an organization associated with the calling party. In some embodiments, obtaining the call handling rules can include obtaining a profile and a policy associated with the called party and determining a call routing based upon analysis of the profile and the policy. Determining the call routing can include determining an active space associated with the called party, determining if the called device is busy, and if a determination is made that the called device is busy, determining if a policy suggests interruption of a communication in which the called device is engaged. The policy can be based upon the active space.

In some embodiments, execution of the computer-executable instructions can cause the processor to perform operations further including if a determination is made that the policy suggests interruption of the communication, routing the communication to another destination, and allowing initiation of the call. In some embodiments, obtaining the call handling rules can include obtaining a profile and a policy associated with the called party, and determining a call routing based upon analysis of the profile and the policy. Determining the call routing can include determining an active space associated with the called party, determining if the called device is located in an irregular time zone or geo-location that differs from a time zone and geo-location associated with the active space, and if a determination is made that the called device is located in the irregular time zone or geo-location, routing the call to another destination.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
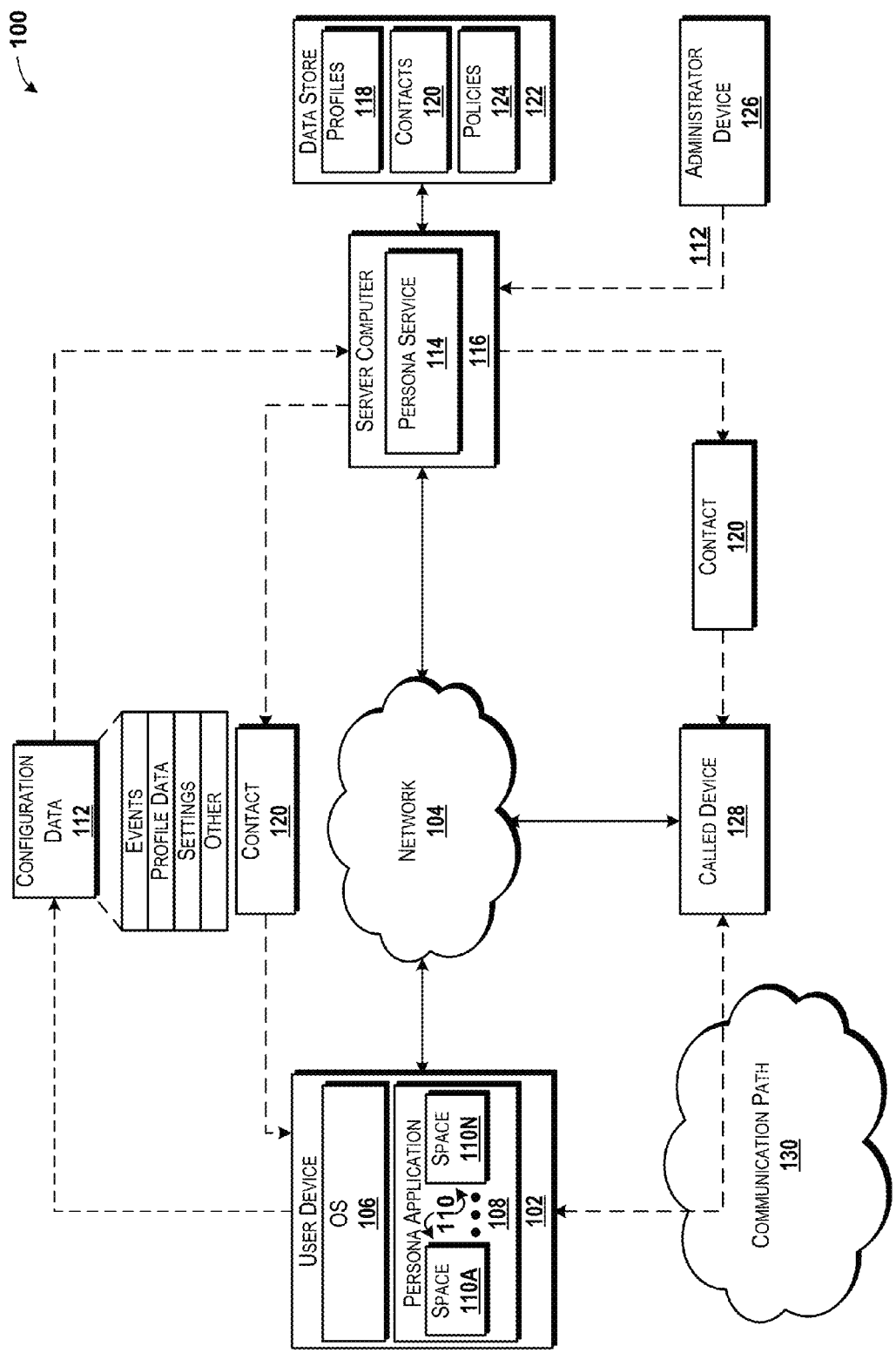
FIG. 1 is a system diagram illustrating an illustrative operating environment for various embodiments of the concepts and technologies described herein.

The following detailed description is directed to providing multiple persona support for communications. A persona service/container can be created by a computing device such as a server computer to provide multiple persona support for highly secured communications. In some embodiments, the user device can initiate a communication with another device such as a receiving device, a called device, or the like. The communication can occur, in some embodiments, over a communication path. The communication can include an email, an instant message, a telephone call, a voice-over-IP ("VoIP") call, a notification (e.g., a push notification, a special purpose short message, a control channel signal, or the like), a text message, a multimedia message service ("MMS") message, combinations thereof, or the like. At initiation of a communication at the user device, depending on where the communication is originated from (which container/personality), a persona application executed by the user device can generate a signal, request, or service call to the receiving device. The persona service within the container can query profiles and/or policies to determine one or more handling rules associated with the communication. The handling rules also can define call routing for the communications, or the like.

The communication can include a communication such as an email, text message, instant message, or the like. The persona service within the specific container can identify one or more contacts associated with the parties of the communication and provide the contacts to the parties engaged in the communication. The persona service within the specific container can be configured to allow delivery of the communication. If the communication corresponds to a call, the persona service can identify one or more call handling rules, which can be based upon the profiles and/or the policies. The call handling rules can define whether or not calls are to be allowed, blocked, sent to voicemail, or the like. The call handling rules also can define interruption rules that may specify when and how activities occurring at a device within one space may be interrupted to accommodate calls in a different space.

If the call handling rules define that the call is to be completed, the persona service can obtain contacts for the calling and called parties, and provide those contacts to the parties for display and/or use during the call. If the call is not to be allowed, the call can be routed to another destination such as a voicemail system, an assistant, an announcement, or the like. Thus, the persona service can use profiles and/or policies to determine if calls are to be completed, to provide contacts for the calls, and/or to define how the calls will be routed. In some embodiments, the contacts obtained by the persona service can be used to override or replace contact information included in a contact list or directory associated with one or more devices involved in a communication (e.g., a sending or calling device and a receiving or called device). In various embodiments of the concepts and technologies described herein, the persona service can support archiving functionality. Thus, the persona service and container can be configured to support archiving during any communication for various reasons.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing multiple persona support for communications will be described, according to an illustrative embodiment. The operating environment 100 shown in FIG. 1 includes a user device 102. The user device 102 can operate in communication with and/or as part of a communications network ("network") 104.

According to various embodiments, the functionality of the user device 102 may be provided by one or more server computers, desktop computers, mobile telephones, smartphones, laptop computers, tablet computers, media devices, set-top boxes, embedded computing systems, vehicle computing and/or communication systems, other computing systems, and the like. It should be understood that the functionality of the user device 102 can be provided by a single device, by two similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, a persona application 108. The operating system 106 can include a computer program for controlling the operation of the user device 102. The persona application 108 can include an executable program configured to execute on top of the operating system 106 to provide various functions illustrated and described herein for enabling multiple persona support for communications. The persona application can partition one or more independent container(s). In various embodiments, there is a personal space within the user device. It is possible that information on the personal space can be cut-and-paste to one, or more of the container(s). However, information exchange among the container(s) can be restricted by the application.

According to various embodiments of the concepts and technologies described herein, a "persona" can include a personality, profile, an environment, and/or the like for a user associated with the user device 102. In some embodiments, the persona application 108 can create and/or support operations within virtual spaces ("spaces") 110A-N (hereinafter collectively and/or generically referred to as "spaces 110" or a "container"). The spaces 110 can include virtual operating environments that can correspond to each personality associated with the user device 102 and/or a user thereof.

The spaces 110 can provide a virtual environment (container) in which a user or entity can interact with and/or operate a device. This container can be associated with a specific role/work-related group/organization with which the owner of the user device is associated. One, or multiple work space(s)/container(s) can be created within the user device to associate with the possible role(s), work-related group(s), or organization(s) that the owner of the user device could have. Within the virtual environment or container, almost any aspect (e.g., user identity, phone number, communication mode, title, user image or photograph, combinations thereof, or the like) can be configured by the administrator of the work-related group, or organization. The spaces 110, however, can be configured to change the various profile or persona details associated with a user while maintaining as consistent underlying hardware, core functionality, and/or even features or other functions in some embodiments. Of course, some spaces 110 can include extra functions or features, or eliminate others, though this is not necessarily the case.

In some embodiments, a space 110 that is associated with a work persona, referred to herein as a work space 110, can allow copying of information into the space 110 (e.g., from a personal persona), but may restrict copying out of the space 110 (e.g., to a personal persona). Thus, the spaces 110 can be used to improve security associated with a device such as the user device 102 without affecting the hardware and/or software associated with the user device 102 other than creating and hosting the spaces 110. It should be understood that these examples are illustrative and therefore should not be construed as being limiting in any way.

For example, a first space 110 can correspond to a personal space and a second space 110 can correspond to a work space for a user. The user can operate within the personal space when the user is away from work and/or at other times, and the user can operate within the work space when the user is at work and/or during working hours. In some embodiments, each of the spaces 110 can include or represent a profile for a user. Thus, the space 110 can include or represent a phone number, an instant messaging ("IM") address, an email address, a VoIP identity and/or address information, call routing tables, user photographs, and/or other aspects of the user's profile and/or identity associated with the space 110. Any number of spaces 110 can be supported by the persona application 108 illustrated and described herein, according to various embodiments.

A user can operate within a work space when the user is at work or at other times. As such, when the user initiates a communication such as a text message, an instant message, an email, a phone call, or the like, the personal application 108 can apply data represented within the associated space 110 (in this example the work space) and provide the communications in accordance with the space 110. Thus, for example, the persona application 108 can route calls in accordance with the space 110, set an identity associated with the space 110, provide information about the user in accordance with the space 110, combinations thereof, or the like. As will be explained in more detail below, the spaces 110 also can be used by other entities to provide contact information to receiving devices or users to identify the sending or calling party based upon information in the space 110 or persona being used to initiate or conduct the communication. These and other functions of the persona application 108 will be illustrated and described in more detail below.

In some embodiments, the persona application 108 can be used to create, apply, and or use the spaces 110 to conduct communications. In various embodiments, the persona application 108 can generate configuration data 112. The configuration data 112 can include events, profile data, settings, and/or other information associated with the spaces 110, the user device 102, and/or the user thereof. It should be understood that this example is illustrative and therefore should not be construed as being limiting in any way.

According to various embodiments, the events can reflect a current space 110 and/or changes among spaces 110. Thus, for example, if a user switches from a personal space to a work space, the persona application 108 can generate an event indicating this change and provide that event to other entities as part of the configuration data 112. It should be understood that changes among spaces 110 can occur without user actions, for example by the persona application 108 based upon detected triggers or events. In some embodiments, the configuration data 112 can be provided to a persona service 114 and/or other service, module, application, or the like, which can be hosted and/or executed by a computing device such as a server computer 116. It should be understood that this example is illustrative and therefore should not be construed as being limiting in any way. More details regarding the persona service 114 and/or its associated functionality will be illustrated and described in more detail below.

The configuration data 112 also can include profile data. The profile data can include data that can reflect or describe one or more user profiles or personas ("profiles"), which can correspond to the spaces 110. The profile data can include, for example, one or more user names, one or more instances of organization and/or department or other business or organization information, one or more phone numbers, one or more email addresses, one or more photographs or other images, one or more instances of callerID information, combinations thereof, or the like. According to various embodiments, the persona service 114 can analyze the events and the profile data to identify a current profile 118 associated with the user device 102 and therefore, a space 110 within which the user device 102 is operating at a particular time. Additional details regarding the profiles 118, the generation and/or storage thereof, and/or how the profiles 118 are used will be provided below.

The configuration data 112 also can include settings. The settings can define various configurations, options, and/or other settings associated with the persona application 108 and/or the persona service 114. Thus, the settings can indicate, for example, how events are defined and/or the particular aspects of various events, definitions of the spaces 110 or related information, how information is provided to other entities, combinations thereof, or the like. The other data can include other information such as historical movement information, trends, time zone information (e.g., a time zone associated with one or more of the spaces 110 and/or profiles 118), organization chart information, combinations thereof, or the like. The other data also can include location information such as geographic location ("geo-location"), or the like. Thus, the other data can be used to determine a geo-location and whether or not the geo-location is associated with and/or departs from an expected geo-location.

The persona application 108 can be activated at the user device 102 and/or interacted with to set a space 110 as being a current space and/or to operate within the space 110. In some embodiments, the persona application 108 can execute in the background and determine a current space 110 based upon a geographic location of the user device 102 (e.g., at home, at work, in transit, or the like); an explicit setting (e.g., a user selects a work space as active, a personal space as active, or the like); communications occurring via the user device 102; times and/or schedules; combinations thereof, or the like. Upon setting or changing a space 110, and/or at other times, the user device 102 can transmit the configuration data 112 to the persona service 114.

The persona service 114 can obtain the configuration data 112 (or a component thereof such as an event, a profile data or indicator, a setting, or the like). The persona service 114 can analyze the configuration data 112 and generate, in some embodiments, one or more profiles 118 based upon the configuration data 112. The profiles 118 can correspond to personas and therefore can include a name, title, a phone number, an email address, other contact information and/or communication routing information, combinations thereof, or the like. Thus, a profile 118 can define a persona or profile associated with the user device 102. Because multiple personas can be defined for the user device 102, it should be understood that multiple profiles 118 may relate to the user device 102 and/or a user thereof.

The persona service 114 also can generate, based upon the configuration data, one or more contacts 120. In some other embodiments, the contacts 120 can be generated by other devices, applications, services, or the like. The contacts 120 can include information associated with one or more spaces 110 and/or profiles 118. The contacts 120 can include at least a name; a department or organization associated with the name; and a telephone number, email address, instant message address, or other contact information associated with the user. As will be illustrated and described in more detail below, the persona service 114 can be configured to provide contacts 120 to devices during communications to support display of space-specific and/or persona-specific information that otherwise may not be displayed during the communication.

According to various embodiments, the persona service 114 can store the profiles 118 and/or the contacts 120 in a local memory or other storage device or computer storage medium as defined herein. According to some other embodiments, the persona service 114 can store the profiles 118 and/or the contacts 120 in a remote data storage device or medium such as a data store 122. The functionality of the data store 122 can be provided by one or more databases, server computers, desktop computers, mobile telephones, laptop computers, other computing systems, and the like. In the illustrated example embodiment, the functionality of the data store 122 can be provided by a server computer that can host the data illustrated within the data store 122. It should be understood that this example is illustrative and therefore should not be construed as being limiting in any way.

As shown in FIG. 1, the data store 122 also can be configured to store one or more policies 124. The policies 124 can be used to define or determine call routing, communication flows, interruption rules, access limits, combinations thereof, or the like, for the user device 102. The policies 124 can include group policies such as, for example, a policy 124 that can govern how a user device 102 is to interrupt a communication, the use of distinctive rings, combinations thereof, or the like. Some example policies 124 will be illustrated and described in more detail below, particularly with reference to FIG. 5. Because the profiles 118, the contacts 120, and/or the policies 124 can be created by administrators and/or other entities, FIG. 1 also shows the configuration data 112 being received by the server computer 116 from a computing device associated with an administrator or other entity such as, for example, an administrator device 126. It should be understood that this example is illustrative and therefore should not be construed as being limiting in any way.

According to various embodiments, the persona service 114 can provide multiple persona support for communications. In some embodiments, the user device 102 can initiate a communication with another device such as a called device 128. The communication can occur, in some embodiments, over a communication path 130. Notwithstanding the name assigned to the "called device," it should be understood that the called device 128 can communicate (and/or be communicated with) via emails, instant messages, telephone calls, voice-over-IP ("VoIP") calls, notifications, text messages, multimedia message service ("MMS") messages, combinations thereof, or the like.

As such, the example of a phone call should be understood as being illustrative of the concepts and technologies described herein and should not be construed as being limiting in any way. Although not shown in FIG. 1, it should be understood that the called device 128 can execute an operating system that can be similar or even identical to the operating system 106; a persona application that can be similar or event identical to the persona application 108; and/or can host or provide multiple personas or spaces that can be similar or even identical to the spaces 110. As such, it should be understood that the illustrated example is illustrative and therefore should not be construed as being limiting in any way.

At initiation of a communication at the user device 102, the persona application 108 can generate a signal (e.g., as part of the call or communication setup signaling) to the persona service 114 or elsewhere (e.g., a call setup device, a data setup device, or the like), if desired, though this is not necessary. The persona service 114 also can be configured to query the profiles 118 and/or the policies 124 to determine one or more handling rules associated with the communication. Alternatively, communications can be detected without queries and/or signaling. Regardless of how the communications are detected, if the communication is a call, the persona service 114 can determine whether the call is to be blocked, accepted, whether distinctive rings are to be used, combinations thereof, or the like. The handling rules also can define call routing for the communications, or the like.

If the communication corresponds to a communication such as an email, text message, instant message, or the like, the persona service 114 can identify one or more contacts 120 associated with the parties to the communication. For example, a contact 120 associated with a party sending the communication can be obtained and provided to the receiving device, and a contact 120 associated with the receiving device can be provided to the sending device. The persona service 114 also can be configured to allow delivery of the communication.

If the communication corresponds to a call, the persona service 114 can identify one or more call handling rules, which can be based upon the profiles 118 and/or the policies 124. Thus, the call handling rules can define whether or not calls are to be allowed, blocked, sent to voicemail, or the like. The call handling rules also can define interruption rules that may specify when and how activities occurring at a device within one space 110 may be interrupted to accommodate calls in a different space 110. These and additional call handling rules are illustrated and described in more detail herein with reference to FIG. 5.

If the call handling rules define that the call is to be completed, the persona service 114 can obtain contacts 120 for the calling and called parties, and provide those contacts 120 to the respective parties for display and/or use during the call. If the call is not to be allowed, the call can be routed to another destination such as a voicemail system, an assistant, an announcement, or the like. Thus, the persona service 114 can use profiles 118 and/or policies 124 to determine if calls are to be completed, to provide contacts 120 for the calls, and/or to define how the calls will be routed.

In some embodiments, the contacts 120 obtained by the persona service 114 can be used to override or replace contact information included in a contact list or directory associated with one or more devices involved in a communication (e.g., a sending or calling device and a receiving or called device). Thus, a called device may not have information for a particular calling device in a local contacts list, but the persona service 114 may provide the contact 120 to provide a photograph, a name, a department or organization, a phone number, or the like to the called device for display during call setup and/or during the call. Alternatively, a called device may have information for the calling device in a local contacts list, but the persona service 114 may provide the contact 120 to override the existing information. Thus, work information included in the contact 120 can override personal information or vice versa. It should be understood that this example is illustrative and therefore should not be construed as being limiting in any way.

It can be appreciated that in some organizations, only a phone number may appear during a call without the contact 120. Thus, the concepts and technologies described herein can enable users (e.g., users within an enterprise) to view various calling party or called party information before, during, or after a communication such as a call by providing new information or overriding existing information. It should be understood that this example is illustrative and therefore should not be construed as being limiting in any way.

In various embodiments of the concepts and technologies described herein, the persona service 114 can support archiving functionality, which can be based upon one or more policies 124. Thus, a policy 124 may specify that communications within particular spaces 110, associated with particular parties, or the like, are to be archived for legal reasons, compliance, regulatory schemes, business record keeping schemes, combinations thereof, or the like. Thus, the persona service 114 can be configured to support archiving during any communication for various reasons. It should be understood that this example is illustrative and therefore should not be construed as being limiting in any way. These and other aspects of the concepts and technologies described herein will be illustrated and described in more detail below.

FIG. 1 illustrates one user device 102, one network 104, one server computer 116, one data store 122, one administrator device 126, one called device 128, and one communication path 130. It should be understood, however, that various implementations of the operating environment 100 can include zero, one, or more than one user device 102; zero, one, or more than one network 104; zero, one, or more than one server computer 116; zero, one, or more than one data store 122; zero, one, or more than one administrator device 126; zero, one, or more than one called device 128; and/or zero, one, or more than one communication path 130. As such, the illustrated embodiment should be understood as being illustrative, and should not be construed as being limiting in any way.

Figure 2:
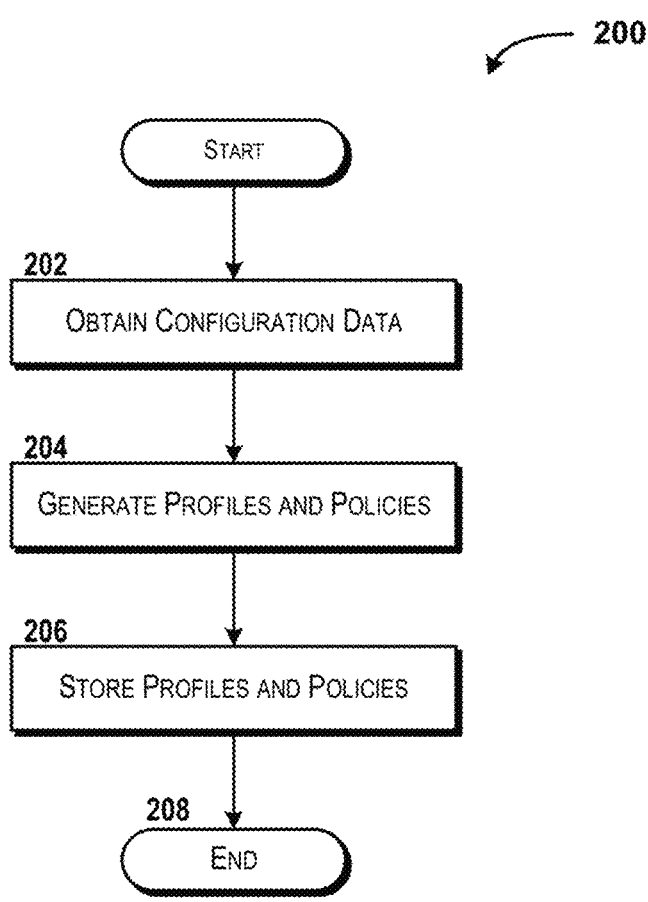
FIG. 2 is a flow diagram showing aspects of a method for storing policies and profiles for a persona service, according to an illustrative embodiment of the concepts and technologies described herein.

Turning now to FIG. 2, aspects of a method 200 for storing policies and profiles for a persona service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device such as the server computer 116 or the user device 102 to perform one or more operations and/or causing the processor to direct other components of the computing system or device to perform one or more of the operations.

For purposes of illustrating and describing the concepts of the present disclosure, the methods disclosed herein are described as being performed by the server computer 116 via execution of one or more software modules such as, for example, the persona service 114. It should be understood that additional and/or alternative devices and/or network nodes can provide the functionality described herein via execution of one or more modules, applications, and/or other software including, but not limited to, the persona service 114. Thus, the illustrated embodiments are illustrative, and should not be viewed as being limiting in any way.

The method 200 begins at operation 202. At operation 202, the server computer 116 can obtain configuration data 112. According to various embodiments of the concepts and technologies described herein, the configuration data 112 and/or portions thereof (e.g., events, profile data, settings, or other data) can be generated by the user device 102 and/or an administrator device 126. Thus, operation 202 can correspond to the user device 102 and/or the administrator device 126 submitting the configuration data 112 to the server computer 116. Because the configuration data 112 can be created by other devices and/or entities, it should be understood that these examples are illustrative and therefore should not be construed as being limiting in any way.

From operation 202, the method 200 proceeds to operation 204. At operation 204, the server computer 116 can generate profiles 118 and policies 124. The server computer 116 can be configured to analyze the configuration data 112 and generate one or more profiles 118 and/or policies 124 based upon the configuration data 112. Thus, for example, the server computer 116 can analyze the configuration data 112 to recognize events associated with personas or spaces 110; user or device information associated with the personas or spaces 110; addresses, phone numbers, email addresses, messaging addresses, or the like associated with the personas or spaces 110; combinations thereof; or the like. The profiles 118 can be stored at the server computer 116 and/or at a data store 122 as explained above.

The server computer 116 also can analyze the configuration data 112 and generate the policies 124 based upon the configuration data 112. In some other embodiments, the server computer 116 can obtain one or more policies 124 from various entities such as the administrator device 126, and as such, the policies 124 may not be generated based upon the configuration data 112 and instead may be created by one or more entities. The policies 124 can define how communications are handled, how devices present information relating to communications of users or other entities, how communications may or may not interrupt other communications, combinations thereof, or the like.

From operation 204, the method 200 proceeds to operation 206. At operation 206, the server computer 116 can store the profiles 118 and the policies 124. As explained above, the profiles 118 and the policies 124 can be stored at the server computer 116 and/or at a remote device such as the data store 122. In some embodiments, the profiles 118 and/or the policies 124 can be stored in a format that can support queries such as a table, a database, or other data structure. Thus, when a communication is initiated, the server computer 116 can be configured to query the profiles 118 and/or the policies 124 to identify a profile 118 and/or policy 124 associated with a device that is party to the communication. It should be understood that this example is illustrative and therefore should not be construed as being limiting in any way.

From operation 206, the method 200 proceeds to operation 208. The method 200 ends at operation 208.

Figure 3:
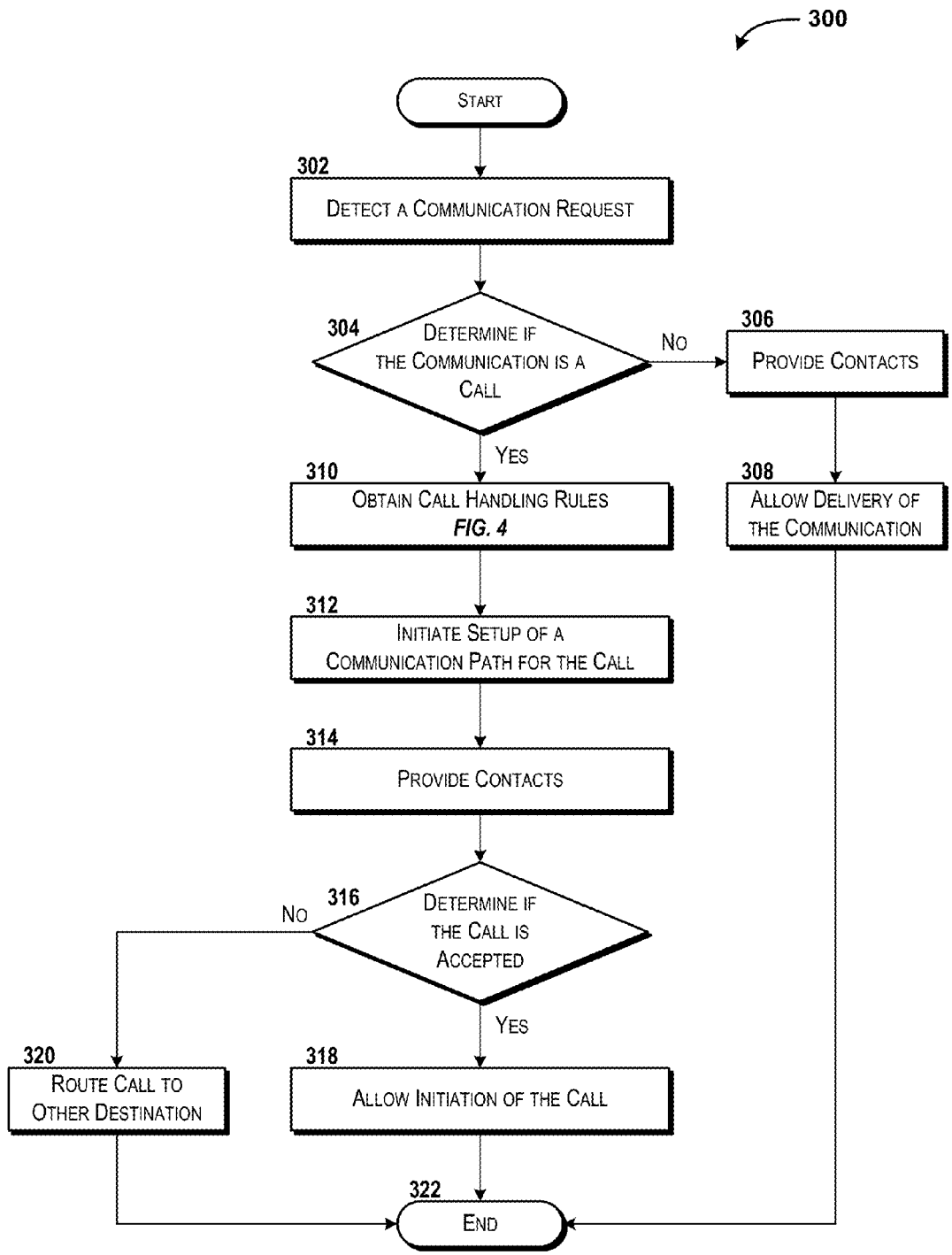
FIG. 3 is a flow diagram showing aspects of a method for providing multiple persona support for a communication, according to an illustrative embodiment of the concepts and technologies described herein.

Turning now to FIG. 3, aspects of a method 300 for providing multiple persona support for a communication will be described in detail, according to an illustrative embodiment. The method 300 begins at operation 302. At operation 302, the server computer 116 can detect a communication request or other communications-related event associated with a device such as, for example, the user device 102. The communication request can correspond to signaling, requests, or the like associated with a telephone call, a VoIP session, a data session, a text message, an MMS message, an instant message, a push to talk session, a notification, a push or pull data transfer, combinations thereof, or the like. Thus, the server computer 116 can detect a communication at a user device 102 in operation 302. It should be understood that this example is illustrative and therefore should not be construed as being limiting in any way.

In some embodiments, the user device 102 or other device that is party to a communication (e.g., the called device 128), can be configured to notify the server computer 116 during the communication, when the communication is initiated, during communication setup, and/or at other times. In some other embodiments, the request obtained in operation 302 can be generated by a call routing device, subscriber database, or other entity that may be queried and/or may participate in setup, initiation, and/or use of the communication path 130 for the communications event. As such, it should be understood that the request illustrated in operation 302 can be generated by various entities and/or can be generated at various times.

From operation 302, the method 300 proceeds to operation 304. At operation 304, the server computer 116 can determine if a communication associated with the communication request or event detected in operation 302 is a call. According to various embodiments of the concepts and technologies described herein, communications may be handled in different manners based upon whether or not the communications are calls (e.g., telephone calls, VoIP calls, voice or video calls, or the like). Thus, the server computer 116 can determine, in operation 304, if the communication is a call or not.

If the server computer 116 determines, in operation 304, that the communication associated with the communication request or event detected in operation 302 is not a call, the method 300 can proceed to operation 306. At operation 306, the server computer 116 can provide contacts 120 to parties to the communication associated with the communication request or event detected in operation 302. Thus, the server computer 116 can obtain a first contact 120 associated with the sending device. In some embodiments, the server computer 116 also can obtain a second contact 120, which can be associated with a recipient device. Thus, in operation 306, the server computer 116 can provide one or more contacts to the parties to the communication. The server computer 116 can provide the contact 120 associated with the recipient device to the sending device (e.g., the user device 102), and the contact 120 associated with the sending device to the recipient device (e.g., the called device 128). It should be understood that this example is illustrative and therefore should not be construed as being limiting in any way.

From operation 306, the method 300 proceeds to operation 308. At operation 308, the server computer 116 can allow delivery of the communication associated with the communication request or event detected in operation 302. Thus, the server computer 116 can instruct an entity that queried the server computer 116 to allow the communication and/or not to interrupt or interfere with delivery of the communication. Because the devices involved in the communication can be provided with the contacts 120, the parties to the communication can be presented with various types and/or instances of information relating to the parties whether or not that information is stored locally by either of the devices (e.g., the user device 102 and/or the called device 128). It should be understood that this example is illustrative and therefore should not be construed as being limiting in any way.

If the server computer 116 determines, in operation 304, that the communication associated with the communication request or event detected in operation 302 is a call, the method 300 can proceed to operation 310. At operation 310, the server computer 116 can obtain call handling rules. The functionality of the server computer 116 for obtaining the call handling rules will be illustrated and described in more detail below with reference to FIG. 4. Briefly, however, the server computer can obtain one or more profiles 118 and/or policies 124, analyze the profiles 118 and/or policies 124, determine call routing for the call, and provide the call routing to the network device. It should be understood that this example is illustrative and therefore should not be construed as being limiting in any way.

From operation 312, the method 300 proceeds to operation 314. At operation 310, the server computer 116 can initiate setup of a communication path 130 for the call. Thus, in operation 310 the server computer can instruct a device involved in call setup to initiate the communication path 130 in accordance with the call handling rules obtained in operation 310. Thus, operation 314 can correspond to the server computer 116 instructing a call setup device and/or call routing module to establish the communication path 130 and/or to initiate establishment of the communication path 130. It should be understood that this example is illustrative and therefore should not be construed as being limiting in any way.

From operation 314, the method 300 proceeds to operation 316. At operation 316, the server computer 116 can provide contacts to the parties to the communication. It should be understood that the functionality of the server computer 116 for providing the contacts 120 in operation 316 can be substantially similar to the functionality of the server computer 116 illustrated and described above with reference to operation 306, though this is not necessarily the case.

From operation 316, the method 300 proceeds to operation 318. At operation 318, the server computer 116 can determine if the call is accepted. The determination in operation 318 can be made in a number of manners. For example, the server computer 116 can determine that the call is blocked by the called device 128, accepted by the called device 128, that the called device 128 is unavailable (e.g., busy, out of range, or the like), that a profile 118 or policy 124 does not allow delivery of the call (e.g., the called device 128 is in a different time zone, involved in a high priority call (higher priority than the incoming call), that the current call is a low priority call (lower priority than the incoming call), combinations thereof, or the like.

If the server computer 116 determines, in operation 316, that the call is accepted (or acceptable to route to the called device 128), the method 300 can proceed to operation 318. At operation 318, the server computer 116 can allow initiation of the call. In some embodiments, the server computer 116 can indicate to various entities that the call can be established over a voice channel, e.g., a voice channel associated with the communication path 130. It should be understood that this example is illustrative and therefore should not be construed as being limiting in any way.

If the server computer 116 determines, in operation 316, that the call is not accepted, the method 300 can proceed to operation 320. At operation 320, the server computer 116 can route the call to another (or alternative) destination (e.g., a destination other than the intended recipient of the communication). Thus, the server computer 116 can instruct one or more devices, applications, or entities to route the communication to a voicemail box, an announcement, an email server, another recipient, combinations thereof, or the like. It should be understood that these examples are illustrative and therefore should not be construed as being limiting in any way.

From operation 320, the method 300 proceeds to operation 322. The method 300 also can proceed to operation 322 from operation 318. The method 300 ends at operation 322.

Figure 4:
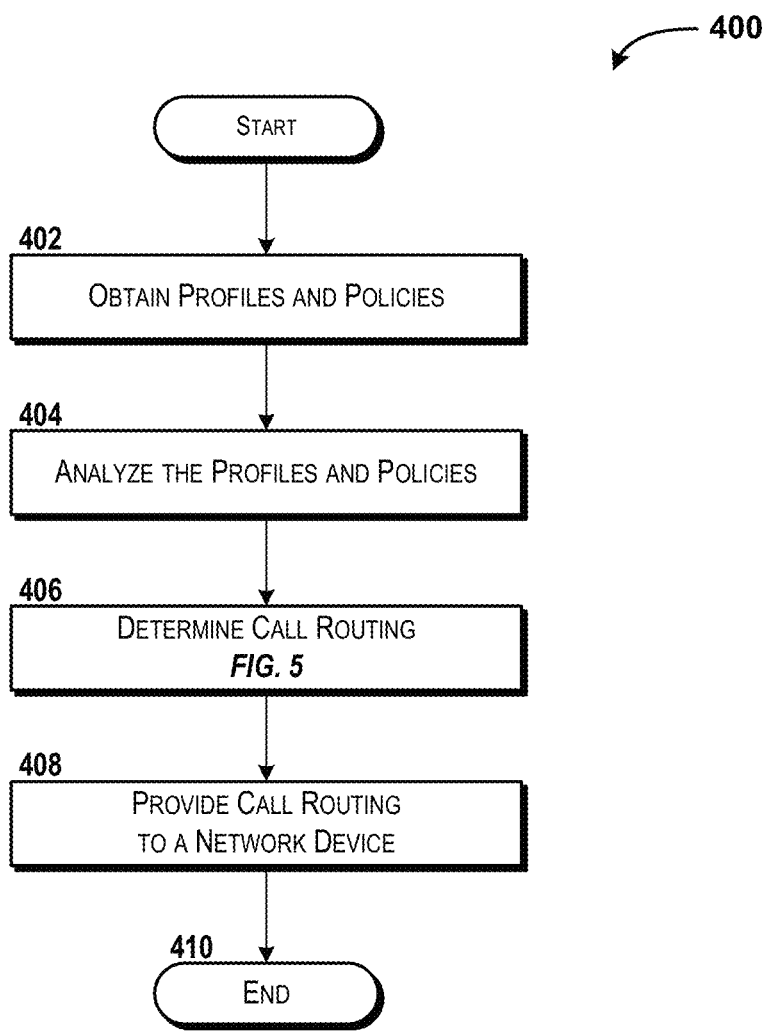
FIG. 4 is a flow diagram showing aspects of a method for determining handling rules for a communication, according to an illustrative embodiment of the concepts and technologies described herein.

Turning now to FIG. 4, aspects of a method 400 for determining handling rules for a communication will be described in detail, according to an illustrative embodiment. The method 400 begins at operation 402. At operation 402, the server computer 116 can obtain profiles 118 and policies 124. It should be understood that in operation 402, the server computer 116 can obtain one or more profiles 118 and/or one or more policies 124. As illustrated and described herein, the profiles 118 can relate to one or more spaces 110 (e.g., personas) associated with a device, and the policies 124 can relate to how communications to a device are routed and/or handled. Thus, the profiles 118 and the policies 124 can specify a persona and any associated handling and/or a group policy and/or associated handling. It should be understood that this example is illustrative and therefore should not be construed as being limiting in any way.

From operation 402, the method 400 proceeds to operation 404. At operation 404, the server computer 116 can analyze the profiles 118 and/or the policies 124. From operation 404, the method 400 proceeds to operation 406. At operation 406, the server computer 116 can determine call routing based upon the profiles 118 and/or the policies 124. Additional details of determining call routing are illustrated and described herein with reference to FIG. 5. Briefly, however, the server computer 116 can determine if a called device is busy, if an in-progress call should be interrupted, if a called device is in a time zone outside of a typical time zone (for the called device), and/or various call handling rules or determinations based upon these determinations. Additional details of these and other call handling decisions are illustrated and described below with reference to FIG. 5.

From operation 406, the method 400 proceeds to operation 408. At operation 408, the server computer 116 can provide call routing to a network device. Thus, based upon the flow illustrated in FIG. 5 (or other flows for determining call routing), the server computer 116 can determine call routing and pass the call routing policy or determinations to one or more devices or entities. Thus, the server computer 116 can determine how the call will be handled and provide information reflecting the determined handling to one or more entities.

From operation 408, the method 400 proceeds to operation 410. The method 400 ends at operation 410.

Figure 5:
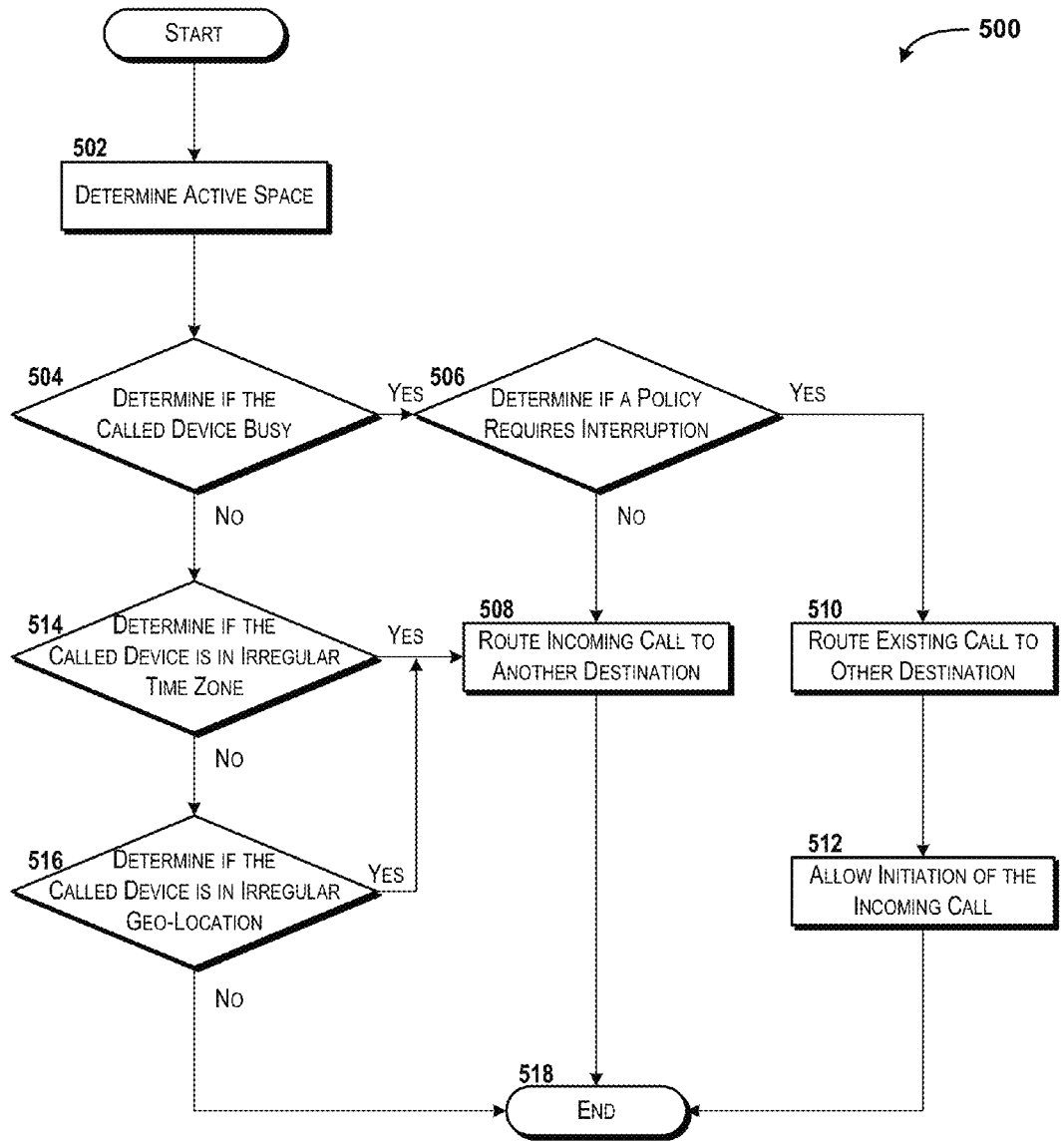
FIG. 5 is a flow diagram showing aspects of a method for determining call routing for a communication, according to an illustrative embodiment of the concepts and technologies described herein.

Turning now to FIG. 5, aspects of a method 500 for determining call routing for a communication will be described in detail, according to an illustrative embodiment. The method 500 begins at operation 502. At operation 502, the server computer 116 can determine an active space 110 for the called device 128. The active space 110 can be determined based upon the configuration data 112, one or more events, one or more profiles 118, and/or other information. Thus, the server computer 116 can determine, in operation 502, if the called device 128 is operating in a space 110 associated with a personal persona (referred to herein as a personal space 110), a space 110 associated with a work persona (referred to herein as a work space 110), or a space 110 associated with another persona. Because the server computer 116 can determine the space 110 in additional or alternative manners (e.g., querying the called device 128, or the like), it should be understood that these examples are illustrative and therefore should not be construed as being limiting in any way.

From operation 502, the method 500 proceeds to operation 504. At operation 504, the server computer 116 can determine if the called device 128 (or other recipient device) is busy. As used herein, "busy" can be used to refer to called device 128 or other device being involved in an existing call or other communication session. "Busy" also can refer to the called device 128 being involved in any activity that may not be interrupted (e.g., a mandatory meeting, a "do not disturb" status, combinations thereof, or the like). Because the called device 128 can be determined to be "busy" in additional and/or alternative ways, it should be understood that these examples are illustrative and therefore should not be construed as being limiting in any way.

If the server computer 116 determines, in operation 504, that the called device 128 is busy, the method 500 can proceed to operation 506. At operation 506, the server computer 116 can determine if one or more of the policies 124 suggests, allows, or requires (labeled "requires" in FIG. 5) interruption of a communication with which the called device 128 is involved (e.g., the communication that resulted in the indication that the called device 128 is busy). Thus, for example, a policy 124 may be defined to indicate that a call in a personal space 110 should be interrupted if a call to the work space 110 is detected. In some other embodiments, a policy 124 may define that a call or other communication occurring in the personal space 110 may not be interrupted by a communication in the work space 110 unless some thresholds or requirements are met such as, for example, a call from a boss, manager, or other entity. Because the policies 124 can require or forbid interruptions in additional and/or alternative ways, or based on additional or alternative considerations, it should be understood that these examples are illustrative and therefore should not be construed as being limiting in any way.

If the server computer 116 determines, in operation 506, that a policy 124 does not require, suggest, or allow an interruption to the communication that the called device 128 is involved with, the method 500 can proceed to operation 508. At operation 508, the server computer 116 can route the call that is directed to the called device (e.g., the call associated with the event detected at operation 302), to another destination such as, for example, a voicemail box, an announcement, an assistant, an alternative number, combinations thereof, or the like. Because calls can be routed to additional and/or alternative locations, it should be understood that these examples are illustrative and therefore should not be construed as being limiting in any way.

If the server computer 116 determines, in operation 506, that a policy does require, suggest, or allow an interruption to the communication that the called device 128 is involved with, the method 500 can proceed to operation 510. At operation 510, the server computer 116 can route an existing call or communication (with which the called device 128 is involved), to another destination such as, for example, a voicemail box, an announcement, an assistant, a line hold operation, a hunt group, a call forward operation, combinations thereof, or the like.

From operation 510, the method 500 proceeds to operation 512. At operation 512, the server computer 116 can allow initiation of the incoming call. In operation 512, the server computer 116 can determine that the call should be established and therefore can allow initiation of the incoming call (e.g., the call to the called device 128). Because the server computer 116 can inform various network devices and/or other hardware or software to allow the incoming call, it should be understood that various types of instructions can be generated by the server computer 116 in operation 512.

Returning now to operation 504, if the server computer 116 determines that the called device 128 is not busy, the method 500 can proceed to operation 514. At operation 514, the server computer 116 can determine if the called device 128 is located within an irregular time zone. For purposes of this description, an "irregular time zone" can include any time zone that is outside of a normal time zone associated with the user device 102 and/or a user thereof. The "normal" time zone can be defined as a time zone associated with a profile 118, a contact 120, or the like. Thus, if the "normal" time zone corresponds to the Eastern time zone (i.e., GMT-5), the called device 128 can be determined to be located in an irregular time zone if the called device 128 is not located at a geographic location within the Eastern time zone.

Thus, for example, if a user or other entity travels out of a "home" or "work" time zone, the policies 124 can be used to define whether calls to a device associated with the user (e.g., the called device 128 or the user device 102) should be screened or filtered based upon time zone information. In one contemplated embodiment, a user may travel to the West Coast of the U.S. from the East Coast of the U.S., travel that can result in a three hour time difference. Thus, if a call is placed to the work space 110 associated with the called device 128 at 7:00 AM Eastern Time (4:00 AM Pacific Time), the persona service 114 can determine if the call should be allowed or blocked, routed to voicemail, or the like. Thus, it can be appreciated that policies 124 can be defined for these and other types of time shift issues that may arise when a user travels, or at other times. It should be understood that this example is illustrative and therefore should not be construed as being limiting in any way.

If the server computer 116 determines, in operation 514, that the called device 128 is located in an irregular time zone, the method 500 can proceed to operation 508. As noted above, the server computer 116 can route the incoming call to another (or alternative) destination in operation 508. If the server computer 116 determines, in operation 514, that the called device 128 is not located in an irregular time zone, the method 500 can proceed to operation 516.

At operation 516, the server computer 116 can determine if the called device 128 is located within an irregular geo-location. For purposes of this description, an "irregular geo-location" can include any geographic location that is outside of a normal geo-location associated with the user device 102 and/or a user thereof. The "normal" geo-location can be defined as a geo-location associated with a profile 118, a contact 120, or the like. Thus, if the "normal" geo-location corresponds to Cape Canaveral, Fla., USA, the called device 128 can be determined to be located in an irregular geo-location if the called device 128 is located outside of a specified distance threshold associated with the geo-location. The threshold can be, for example, ten feet, one hundred feet, one hundred meters, one mile, ten miles, one hundred miles, or the like.

Thus, for example, if a user or other entity travels out of a geo-location associated with a "home" or "work" location, the policies 124 can be used to define whether calls to a device associated with the user (e.g., the called device 128 or the user device 102) should be allowed, blocked, or the like. It should be understood that this example is illustrative and therefore should not be construed as being limiting in any way. By imposing geo-location limitations on profile or personas, the concepts and technologies described herein can be used to limit access to corporate information when a user is outside of an assigned location associated with a work profile, or the like.

If the server computer 116 determines, in operation 516, that the called device 128 is located in an irregular geo-location, the method 500 can proceed to operation 508. As noted above, the server computer 116 can route the incoming call to another (or alternative) destination in operation 508. If the server computer 116 determines, in operation 516, that the called device 128 is not located in an irregular geo-location, the method 500 can proceed to operation 518.

Figure 6:
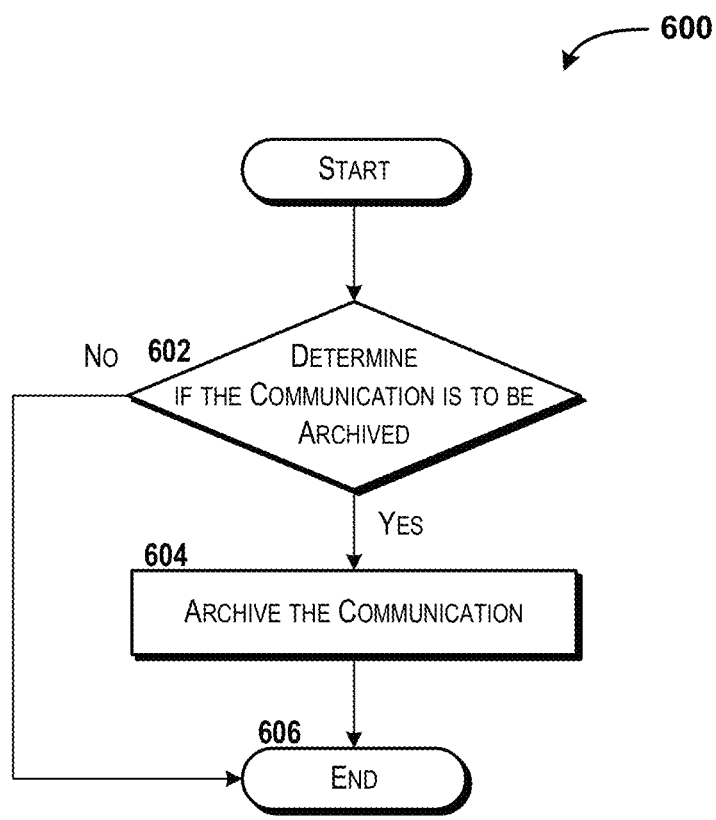
FIG. 6 is a flow diagram showing aspects of a method for archiving communications, according to an illustrative embodiment of the concepts and technologies described herein.

The method 500 also can proceed to operation 518 from operations 508 and 512. The method 500 ends at operation 518. It should be understood that the functionality illustrated and described herein with reference to operation 516 can be performed under other circumstances and need not be performed within the method 500 and/or at the illustrated position within the flow illustrated in FIG. 5. As such, the illustrated embodiment should not be construed as being limiting in any way Turning now to FIG. 6, aspects of a method 600 for archiving communications in a multiple persona environment will be described in detail, according to an illustrative embodiment. It should be understood that the method 600 can be performed by the server computer 116 at almost any time. For example, the server computer 116 can execute the functionality illustrated and described herein with reference to FIG. 6 in conjunction with execution of the methods 300, 400, and 500 illustrated and described herein with reference to FIGS. 3-5. The functionality illustrated and described herein with reference to FIG. 6 can also be executed at other times.

The method 600 begins at operation 602. At operation 602, the server computer 116 can determine if a communication is to be archived. In the context of the method 300 illustrated and described in FIG. 3, the server computer 116 can determine if the communication associated with the event detected in operation 302 is to be archived. The determination as to whether or not to archive a communication can be made as part of the call handling determinations and/or call routing determinations. Thus, it can be appreciated that the determination as to whether or not to archive a communication can be based upon a profile 118 and/or a policy 124 such as the profiles 118 and/or policies 124 analyzed in operation 404. It should be understood that this example is illustrative and therefore should not be construed as being limiting in any way.

If the server computer 116 determines, in operation 602, that the communication should be archived, the method 600 proceeds to operation 604. At operation 604, the server computer 116 can archive the communication. The communication can be archived for various purposes such as, for example, record keeping purposes; compliance with regulations, law, or policies; combinations thereof, or the like. The communication can be archived by storing data associated with the communication such as parties to the communication, content of the communication, combinations thereof, or the like.

From operation 604, the method 600 proceeds to operation 606. The method 600 also can proceed to operation 606 if the server computer 116 determines, in operation 602, that the communication is not to be archived. The method 600 ends at operation 606.

Figure 7:
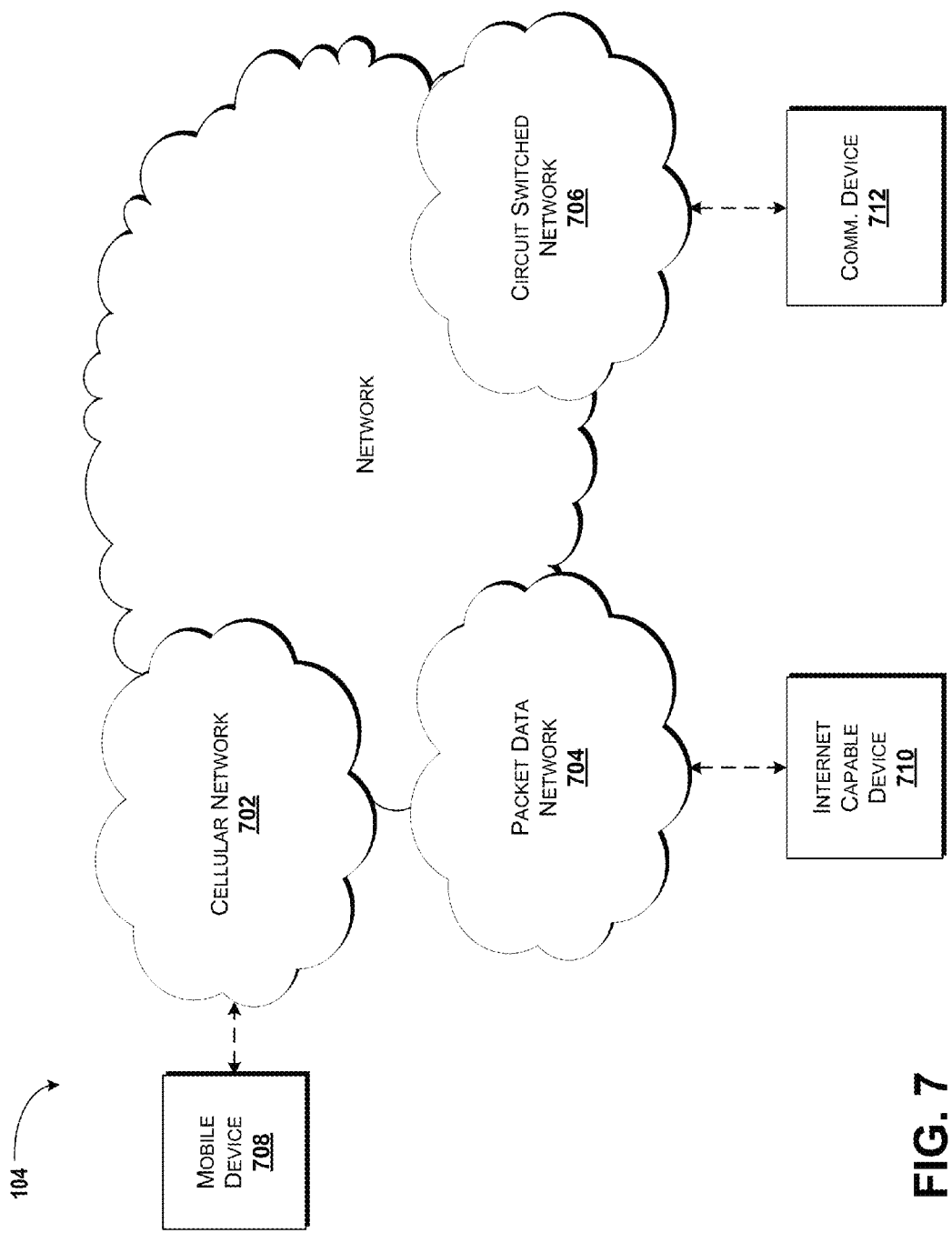
FIG. 7 schematically illustrates a network, according to an illustrative embodiment of the concepts and technologies described herein.

Turning now to FIG. 7, additional details of the network 104 are illustrated, according to an illustrative embodiment. The network 104 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 104 is used to refer broadly to any combination of the networks 702, 704, 706. It should be appreciated that substantially all of the functionality described with reference to the network 104 can be performed by the cellular network 702, the packet data network 704, and/or the circuit switched network 706, alone or in combination with other networks, network elements, and the like.

Figure 8:
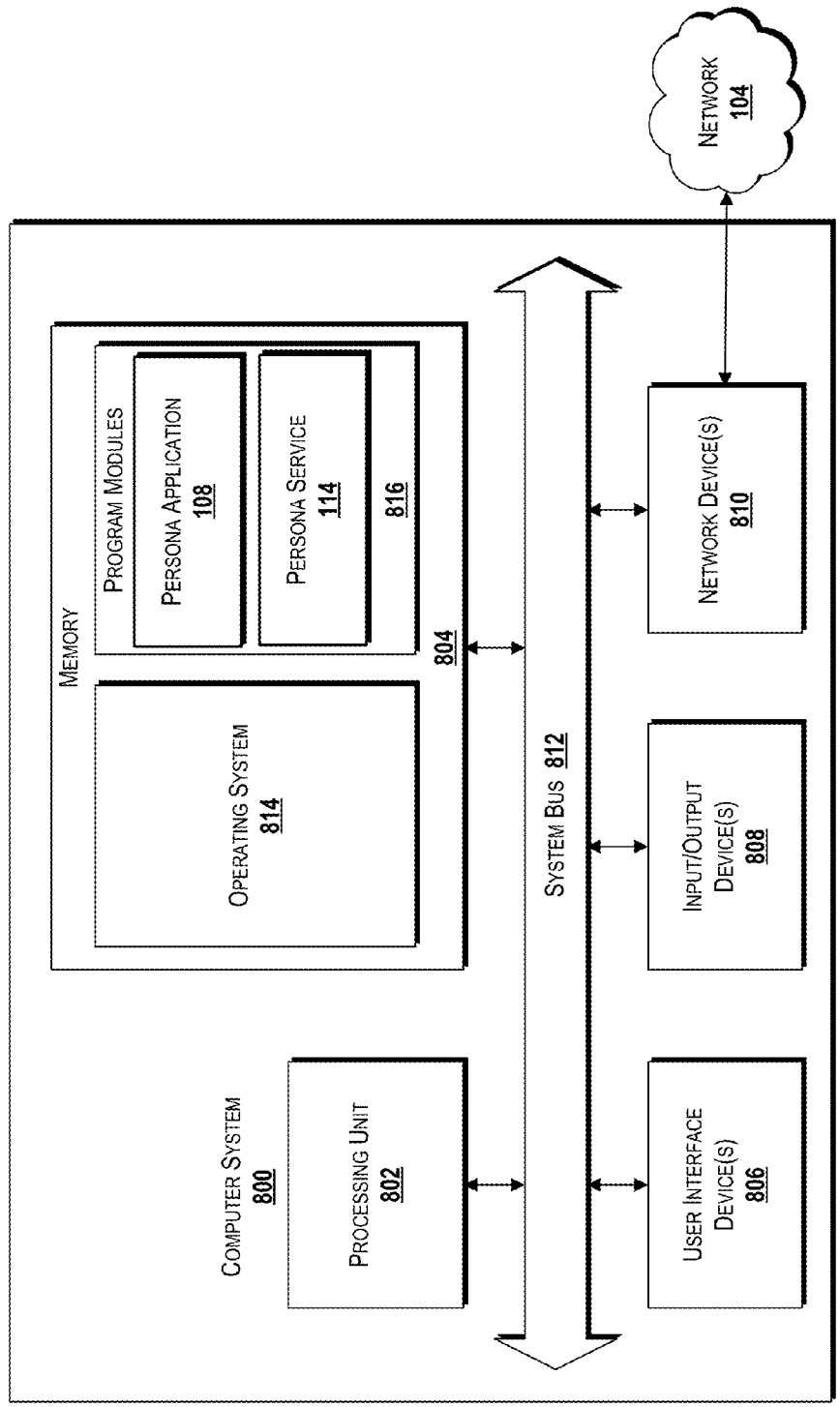
FIG. 8 is a block diagram illustrating an example computer system configured to provide multiple persona support for communications, according to some illustrative embodiments of the concepts and technologies described herein.

FIG. 8 is a block diagram illustrating a computer system 800 configured to provide the functionality described herein for providing multiple persona support for communications, in accordance with various embodiments of the concepts and technologies disclosed herein. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the persona application 108 and/or the persona service 114. These and/or other programs can be embodied in computer-readable media containing instructions that, when executed by the processing unit 802, perform one or more of the methods 200, 300, 400, 500, 600 described in detail above with respect to FIGS. 2-6. According to embodiments, the program modules 816 may be embodied in hardware, software, firmware, or any combination thereof. Although not shown in FIG. 8, it should be understood that the memory 804 also can be configured to store the configuration data 112, the profiles 118, the contacts 120, the policies 124, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 104. Examples of the network devices 810 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 9:
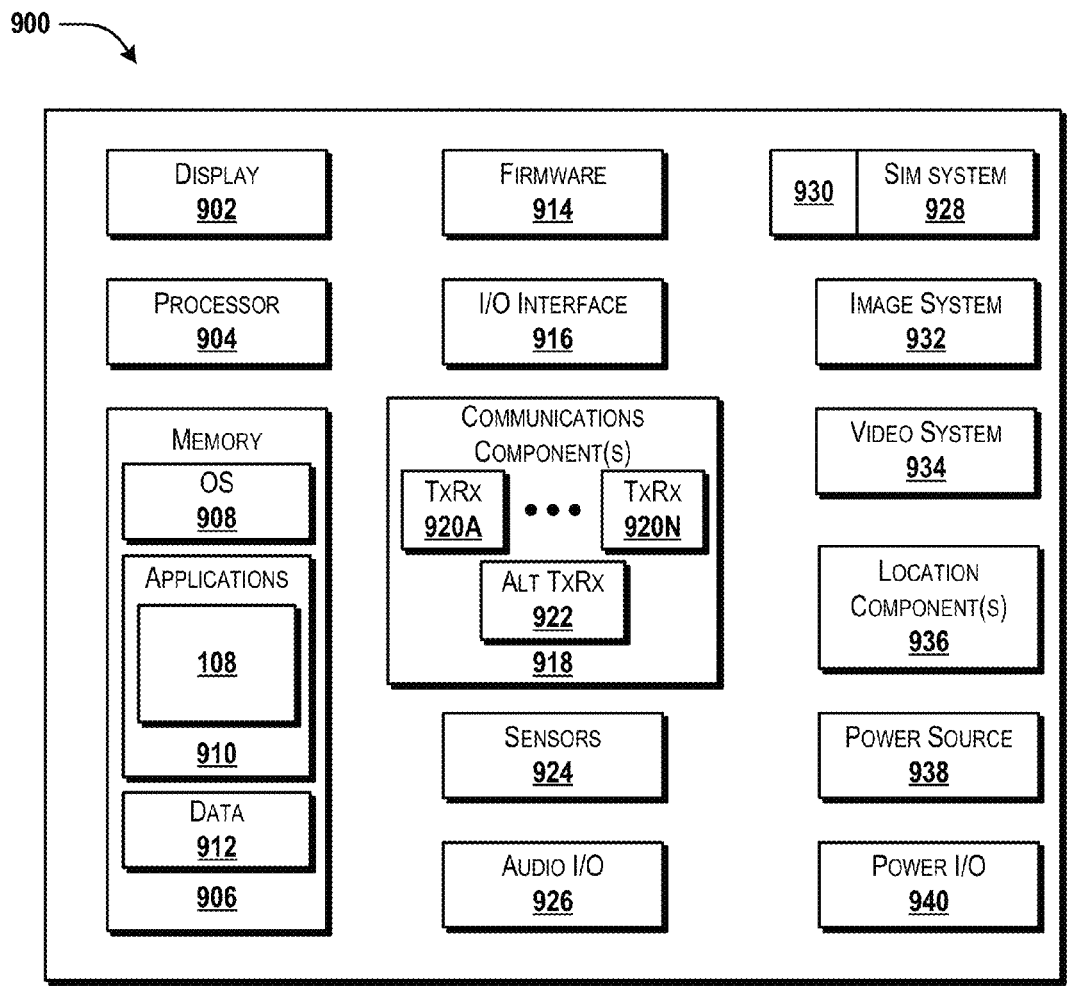
FIG. 9 is a block diagram illustrating an example mobile device configured to interact with a persona service, according to some illustrative embodiments of the concepts and technologies described herein.

Turning now to FIG. 9, an illustrative mobile device 900 and components thereof will be described. In some embodiments, the user device 102, the called device 128, the server computer 116, and/or the data store 122 described above with reference to FIGS. 1-8 can be configured as and/or can have an architecture similar or identical to the mobile device 900 described herein in FIG. 9. It should be understood, however, that the user device 102, the called device 126, the server computer 116, and/or the data store 122 may or may not include the functionality described herein with reference to FIG. 9. While connections are not shown between the various components illustrated in FIG. 9, it should be understood that some, none, or all of the components illustrated in FIG. 9 can be configured to interact with one other to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various graphical user interface ("GUI") elements for viewing spaces 110, contacts 120, text, images, video, virtual keypads and/or keyboards, messaging data, notification messages, metadata, internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910 such as the persona application 108 and/or the persona service 114, other computer-executable instructions stored in a memory 906, or the like. In some embodiments, the applications 910 also can include a UI application (not illustrated in FIG. 9).

The UI application can interface with the operating system 908, such as the operating system 106 shown in FIG. 1, to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the MS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering content, in creating profile data, generating events, and/or other configuration data 112, viewing contacts 120 and/or information, configuring settings, manipulating address book content and/or settings, multimode interaction, interacting with other applications 910, and otherwise facilitating user interaction with the operating system 908, the applications 910, and/or other types or instances of data 912 that can be stored at the mobile device 900. The data 912 can include, for example, profiles 118, contacts 120, policies 124, configuration data 112, and/or other applications or program modules. According to various embodiments, the data 912 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, user information, organization information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks such as the network 104 described herein. In some embodiments, other networks include networks that utilize non-cellular wireless technologies such as WI-FI or WIMAX. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using GSM, CDMAONE, CDMA2000, LTE, and various other 2G, 2.5G, 3G, 4G, and greater generation technology standards. Moreover, the communications component 918 may facilitate communications over various channel access methods (which may or may not be used by the aforementioned standards) including, but not limited to, TDMA, FDMA, W-CDMA, OFDM, SDMA, and the like.

In addition, the communications component 918 may facilitate data communications using GPRS, EDGE, the HSPA protocol family including HSDPA, EUL or otherwise termed HSUPA, HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

Based on the foregoing, it should be appreciated that systems and methods for providing multiple persona support for communications have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   detecting, at a processor executing a persona service, a communication request comprising a request to initiate a communication with a called device associated with a called party;
   determining, at the processor, if the communication comprises a call; and
   if a determination is made that the communication comprises the call,
      obtaining, by the processor, call handling rules,
      determining, by the processor, an active space for the called device, wherein the called device supports a plurality of spaces comprising the active space, wherein each of the plurality of spaces comprises a corresponding virtual environment that supports interactions with a user device associated with a calling party; wherein a first space of the plurality of spaces comprises a first virtual environment that associates the interactions with a first address at the called device, a first role associated with the called party, a first group associated with the called party, and a first organization associated with the called party, and wherein the active space comprises a second virtual environment that associates the interactions with a second address at the called device, a second role associated with the called party, a second group associated with the called party, and a second organization associated with the called party,
      determining, by the processor and based on the call handling rules and the active space, a call routing for the communication,
      initiating, by the processor and based on the call routing, setup of a communication path for the call, wherein the communication path is set up between the user device associated with the calling party and the second address that is associated with the active space for the called device,
      providing, by the processor, a first contact to the user device associated with the calling party,
      providing, to the called device via the second address, a second contact to the called device, the second contact comprising an image associated with the calling party, a phone number associated with the calling party, and an organization associated with the calling party, wherein the second contact replaces a version of the second contact stored by the called device,
      determining, by the processor, if the called device is located in an irregular time zone that differs from a time zone associated with the active space,
      if a determination is made that the called device is not located in the irregular time zone, determining, by the processor, if the called device is located in an irregular geolocation that differs from a geolocation associated with the active space,
      in response to determining that the called device is not located in the irregular geolocation, determining, by the processor, if the call is accepted by the called device,
      if a determination is made that the call is accepted, allowing, by the processor, initiation of the call, and
      if a determination is made that the call is not accepted, routing the call to a voicemail box associated with the called device.

2. The method of claim 1, further comprising:
   if a determination is made that the communication does not comprise the call, providing, by the processor, the first contact and the second contact to parties to the communication; and
   allowing, by the processor, delivery of the communication.

3. The method of claim 1, wherein obtaining the call handling rules comprises:
   obtaining a profile and a policy associated with the called party; and
   determining the call routing based upon the call handling rules and an analysis of the profile and the policy.

4. The method of claim 3, wherein determining the call routing comprises:
   determining that the called device is busy with a further call within the active space;
   in response to determining that the called device is busy with the further call within the active space, determining if a policy suggests interruption of the further call within the active space; wherein the policy is based upon the active space;
   if a determination is made that the policy suggests interruption of the further call,
      routing the further call to another destination, and
      allowing initiation of the call with the second address of the active space; and
   if a determination is made that the policy does not suggest interruption of the further call, routing the call to the voicemail box associated with the called device.

5. The method of claim 1, wherein the first space comprises a personal space, and wherein the active space comprises a work space.

6. The method of claim 1, further comprising:
   determining that the communication should be archived; and
   archiving the communication.

7. The method of claim 1, wherein the second virtual environment further associates the interactions with an instant messaging address.

8. The method of claim 1, wherein the second virtual environment further associates the interactions with a voice over internet protocol identity.

9. The method of claim 1, wherein the second virtual environment further associates the interactions with a call routing table.

10. A system comprising:
a processor; and
a memory that stores computer-executable instructions that, when executed by the processor, cause the processor to perform operations comprising
detecting, a communication request comprising a request to initiate a communication with a called device associated with a called party,
determining if the communication comprises a call, and
if a determination is made that the communication comprises the call,
obtaining call handling rules,
determining an active space for the called device, wherein the called device supports a plurality of spaces comprising the active space, wherein each of the plurality of spaces comprises a corresponding virtual environment that supports interactions with a user device associated with a calling party, wherein a first space of the plurality of spaces comprises a first virtual environment that associates the interactions with a first address at the called device, a first role associated with the called party, a first group associated with the called party, and a first organization associated with the called party, and wherein the active space comprises a second virtual environment that associates the interactions with a second address at the called device, a second role associated with the called party, a second group associated with the called party, and a second organization associated with the called party, determining, based on the call handling rules and the active space, a call routing for the communication,
initiating, based on the call routing, setup of a communication path for the call, wherein the communication path is set up between the user device associated with the calling party and the second address that is associated with the active space for the called device,
providing a first contact to the user device associated with the calling party,
providing, to the called device via the second address, a second contact to the called device, the second contact comprising an image associated with the calling party, a phone number associated with the calling party, and an organization associated with the calling party, wherein the second contact replaces a version of the second contact stored by the called device,
determining if the called device is located in an irregular time zone that differs from a time zone associated with the active space,
if a determination is made that the called device is not located in the irregular time zone, determining if the called device is located in an irregular geolocation that differs from a geolocation associated with the active space,
in response to determining that the called device is not located in the irregular geolocation, determining if the call is accepted by the called device,
if a determination is made that the call is accepted, allowing initiation of the call, and
if a determination is made that the call is not accepted, routing the call to a voicemail box associated with the called device.

11. The system of claim 10, wherein obtaining the call handling rules comprises:

obtaining a profile and a policy associated with the called party; and
determining the call routing based upon the call handling rules and an analysis of the profile and the policy, wherein determining the call routing comprises
determining that the called device is busy with a further call within the active space,
in response to determining that the called device is busy with the further call within the active space, determining if a policy suggests interruption of the further call within the active space, wherein the policy is based upon the active space,
if a determination is made that the policy suggests interruption of the further call,
routing the further call to another destination, and
allowing initiation of the call with the second address of the active space, and
if a determination is made that the policy does not suggest interruption of the further call, routing the call to the voicemail box associated with the called device.

12. The system of claim 10, wherein the second virtual environment further associates the interactions with an instant messaging address.

13. The system of claim 10, wherein the second virtual environment further associates the interactions with a voice over internet protocol identity.

14. The system of claim 10, wherein the second virtual environment further associates the interactions with a call routing table.

15. A computer storage medium having computer-executable instructions stored thereon that, when executed by a processor, cause the processor to perform operations comprising:
detecting, a communication request comprising a request to initiate a communication with a called device associated with a called party;
determining if the communication comprises a call; and
if a determination is made that the communication comprises the call,
obtaining call handling rules,
determining an active space for the called device, wherein the called device supports a plurality of spaces comprising the active space, wherein each of the plurality of spaces comprises a corresponding virtual environment that supports interactions with a user device associated with a calling party, wherein a first space of the plurality of spaces comprises a first virtual environment that associates the interactions with a first address at the called device, a first role associated with the called party, a first group associated with the called party, and a first organization associated with the called party, and wherein the active space comprises a second virtual environment that associates the interactions with a second address at the called device, a second role associated with the called party, a second group associated with the called party, and a second organization associated with the called party, determining, based on the call handling rules and the active space, a call routing for the communication,
initiating, based on the call routing, setup of a communication path for the call, wherein the communication path is set up between the user device associated with the calling party and the second address that is associated with the active space for the called device, providing a first contact to the user device associated with the calling party, providing, to the called device via the second address, a second contact to the called device, the second contact comprising an image associated with the calling party, a phone number associated with the calling party, and an organization associated with the calling party, wherein the second contact replaces a version of the second contact stored by the called device, determining if the called device is located in an irregular time zone that differs from a time zone associated with the active space, if a determination is made that the called device is not located in the irregular time zone, determining if the called device is located in an irregular geolocation that differs from a geolocation associated with the active space, in response to determining that the called device is not located in the irregular geolocation, determining if the call is accepted by the called device, if a determination is made that the call is accepted, allowing initiation of the call, and if a determination is made that the call is not accepted, routing the call to a voicemail box associated with the called device.

16. The computer storage medium of claim 15, wherein obtaining the call handling rules comprises:

obtaining a profile and a policy associated with the called party; and determining the call routing based upon the call handling rules and an analysis of the profile and the policy, wherein determining the call routing comprises determining that the called device is busy with a further call within the active space, in response to determining that the called device is busy with the further call within the active space, determining if a policy suggests interruption of the further call within the active space, wherein the policy is based upon the active space, if a determination is made that the policy suggests interruption of the further call, routing the further call to another destination, and allowing initiation of the call with the second address of the active space, and if a determination is made that the policy does not suggest interruption of the further call, routing the call to the voicemail box associated with the called device.

17. The computer storage medium of claim 15, wherein the second virtual environment further associates the interactions with an instant messaging address.

18. The computer storage medium of claim 15, wherein the second virtual environment further associates the interactions with a voice over internet protocol identity.

19. The computer storage medium of claim 15, wherein the second virtual environment further associates the interactions with a call routing table.

* * * * *